United States Patent
Wilt et al.

(10) Patent No.: US 8,365,024 B2
(45) Date of Patent: Jan. 29, 2013

(54) HIGH INTEGRITY DATA BUS FAULT DETECTION USING MULTIPLE SIGNAL COMPONENTS

(75) Inventors: Nicholas Wilt, Glendale, AZ (US); Scott Gray, Peoria, AZ (US); Mitch Fletcher, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 405 days.

(21) Appl. No.: 12/713,712

(22) Filed: Feb. 26, 2010

(65) Prior Publication Data

US 2011/0214043 A1 Sep. 1, 2011

(51) Int. Cl.
- G01R 31/28 (2006.01)
- G06F 7/02 (2006.01)
- H03M 13/00 (2006.01)

(52) U.S. Cl. .................. 714/712; 714/820
(58) Field of Classification Search .......... 714/712, 714/11, 819, 820, 816, 799, 757, 776, 755, 714/724, 758

See application file for complete search history.

(56) References Cited

U.S. PATENT DOCUMENTS

| | | | |
|---|---|---|---|
| 3,543,048 A | 11/1970 | Klaschka | |
| 4,088,963 A | 5/1978 | Machida et al. | |
| 4,370,706 A | 1/1983 | Doniger et al. | |
| 4,486,826 A | 12/1984 | Wolff et al. | |
| 4,903,270 A | 2/1990 | Johnson et al. | |
| 4,967,347 A | 10/1990 | Smith et al. | |
| 4,991,174 A | 2/1991 | Mori et al. | |
| 5,136,704 A * | 8/1992 | Danielsen et al. | 714/11 |
| 5,276,690 A | 1/1994 | Lee et al. | |
| 5,339,408 A * | 8/1994 | Bruckert et al. | 714/11 |
| 5,349,691 A | 9/1994 | Harrison et al. | |
| 5,373,508 A | 12/1994 | Guliani | |
| 5,386,518 A | 1/1995 | Reagle et al. | |
| 5,486,777 A | 1/1996 | Nguyen | |
| 5,513,527 A | 5/1996 | Griffiths | |
| 5,563,526 A | 10/1996 | Hastings et al. | |
| 5,581,739 A | 12/1996 | FitzPatrick | |
| 5,586,124 A | 12/1996 | Nicolaidis | |
| 5,602,828 A | 2/1997 | Engdahl et al. | |
| 5,758,058 A | 5/1998 | Milburn | |
| 5,794,055 A | 8/1998 | Langer et al. | |
| 5,805,797 A | 9/1998 | Sato et al. | |

(Continued)

OTHER PUBLICATIONS

USPTO Office Action for U.S. Appl. No. 12/886,276; Notification date Nov. 25, 2011.

(Continued)

Primary Examiner — Phung Chung
(74) Attorney, Agent, or Firm — Ingrassia Fisher & Lorenz, P.C.

(57) ABSTRACT

Methods and apparatus are provided for verifying the integrity of a signal transmitted across a multiple rail data bus. The method and apparatus provide for independently processing a signal by a first processor and a second processor, the first and second processors being connected in parallel thereby generating a first processed signal and a second processed signal. Each of the processed signals is split into a first component sequence and a second component sequence, the first component sequences being different from the second component sequences. It is then determined that the first component sequences are not identical and that the second component sequences are not identical. If either of the first component sequences is not identical, or if either of the second component sequences is not identical, then an error signal is transmitted to a receiving device via a first or second rail of the bus.

20 Claims, 4 Drawing Sheets

U.S. PATENT DOCUMENTS

| | | | |
|---|---|---|---|
| 5,937,202 A | 8/1999 | Crosetto |
| 6,023,774 A | 2/2000 | Minagawa |
| 6,085,350 A | 7/2000 | Emmert et al. |
| 6,150,836 A | 11/2000 | Abbott |
| 6,255,972 B1 | 7/2001 | Gross, Jr. et al. |
| 6,260,087 B1 | 7/2001 | Chang |
| 6,289,024 B1 | 9/2001 | Toillon |
| 6,311,149 B1 | 10/2001 | Ryan et al. |
| 6,448,914 B1 | 9/2002 | Younis et al. |
| 6,604,177 B1 | 8/2003 | Kondo et al. |
| 6,721,581 B1 | 4/2004 | Subramanian |
| 6,731,232 B1 | 5/2004 | Kearney |
| 6,804,292 B2 | 10/2004 | Liu et al. |
| 6,825,689 B1 | 11/2004 | Snyder |
| 6,864,822 B2 | 3/2005 | Gulati et al. |
| 6,948,091 B2 | 9/2005 | Bartels et al. |
| 7,049,989 B2 | 5/2006 | Runals et al. |
| 7,072,779 B2 | 7/2006 | Hancock et al. |
| 7,190,748 B2 | 3/2007 | Kim et al. |
| 7,215,197 B2 | 5/2007 | Regier |
| 7,301,362 B2 | 11/2007 | Jang et al. |
| 7,369,078 B2 | 5/2008 | Nickel et al. |
| 7,405,682 B2 | 7/2008 | Ebner et al. |
| 7,408,495 B2 | 8/2008 | Stein et al. |
| 7,411,538 B1 | 8/2008 | Piasecki |
| 7,505,400 B2 | 3/2009 | Bibby et al. |
| 7,516,303 B2 | 4/2009 | Kundu et al. |
| 7,548,590 B2 | 6/2009 | Koller et al. |
| 7,584,345 B2 | 9/2009 | Doering et al. |
| 7,589,649 B1 | 9/2009 | Aga et al. |
| 7,602,274 B2 | 10/2009 | Lee et al. |
| 7,609,100 B2 | 10/2009 | Nagata |
| 7,673,087 B1 | 3/2010 | Ansari et al. |
| 7,715,433 B2 | 5/2010 | Boren |
| 7,791,370 B1 | 9/2010 | Hoang et al. |
| 7,850,127 B2 * | 12/2010 | Lemonovich et al. ........ 246/1 C |
| 2006/0010438 A1 | 1/2006 | Brady, Jr. et al. |
| 2006/0038710 A1 | 2/2006 | Staszewski et al. |
| 2007/0063197 A1 | 3/2007 | Burkatovsky |
| 2007/0126584 A1 | 6/2007 | Hyde et al. |
| 2008/0079148 A1 | 4/2008 | Leung et al. |
| 2008/0297388 A1 | 12/2008 | Thiagarajan et al. |
| 2009/0140809 A1 | 6/2009 | Chi |
| 2009/0175381 A1 | 7/2009 | Bougard |
| 2010/0005366 A1 | 1/2010 | Dell et al. |

OTHER PUBLICATIONS

USPTO Office Action dated Mar. 6, 2012 for U.S. Appl. No. 12/768,448.

USPTO Office Action for U.S. Appl. No. 12/750,341; Notification date Apr. 29, 2011.

USPTO Office Action for U.S. Appl. No. 12/886,276; Notification date May 31, 2012.

USPTO, Notice of Allowance issued in U.S. Appl. No. 12/886,276, dated Nov. 7, 2012.

* cited by examiner

HIGH INTEGRITY DATA BUS FAULT DETECTION USING MULTIPLE SIGNAL COMPONENTS

TECHNICAL FIELD

This document generally relates to self checking, multiple rail data busses, and more particularly relates to data integrity verification utilizing separate data channels of multi-channel bus structures.

BACKGROUND

In designing communications busses, engineers incorporate physical redundancies to provide operational safety and incorporate data redundancies to insure informational integrity. Commonly, multiple lanes with two or more processors in each lane are used to provide this redundancy.

A communications bus may include dual independent lanes, each with a primary processor and a checking processor (i.e. a backup processor). Each of the primary and checking processors may provide identical output signals in response to input signals from one or more sensors representative of characteristics of an aircraft or other complex system. These output signals are commonly compared to one another to determine if a data error has occurred during processing by the primary and checking processors.

Systems engineers conventionally ensure that data errors do not produce systems failures by incorporating self checking, multiple rail features into system data busses. These self-checking features typically use a comparator sub-circuit where multiple, independent and normally identical data messages are compared on a bit-by-bit or on a packet-by-packet basis in their entireties. Conventional methods typically require that each of two complete and identical component sequences be transmitted across a separate rail of a multiple rail (i.e. multiple paths) bus, which necessarily consumes a certain amount of valuable bandwidth.

For example, the outputs of a first and a second primary processor may be monitored with respect to each other and a comparison signal resulting therefrom may be generated. A comparison process may be conducted between a first and a second redundant processor. Similarly, signals generated by the primary processor and its corresponding redundant processor may also be compared. As such, the bandwidth required to pass these redundant signals along a single data bus may increase geometrically with the number of processors.

Accordingly, it is desirable to achieve data integrity verification in a more efficient manner. Furthermore, other desirable features and characteristics will become apparent from the subsequent detailed description and the appended claims, taken in conjunction with the accompanying drawings and this background of the invention.

BRIEF SUMMARY

A method is provided for verifying the integrity of a signal transmitted across a multiple rail data bus. The method comprises generating a first processed signal by a first processor and generating a second processed signal by a second processor, the first and second processors being connected in parallel. Each of the processed signals is split into a first component sequence and a second component sequence, the first component sequences being different from the second component sequences. It is then determined that the first component sequences are not identical and that the second component sequences are not identical. If either of the first component sequences is not identical, or if either of the second component sequences is not identical, then an error signal is transmitted to a receiving device via a first or second rail of the bus.

An apparatus is provided for verifying the integrity of a signal transmitted across a data bus. The apparatus comprises a first rail that includes a first processor configured to split the signal in order to generate at least a first component part and a second component part, a first comparator circuit configured to compare the first component part generated by the first processor to another first component part and to compare the second component part generated by the first processor to another second component part. The apparatus also comprises a second rail that includes a second processor configured to split the signal into at least the other first component part and the other second component part and a second comparator circuit configured to compare the first component part generated by the first processor to the other first component part and to compare the second component part generated by the first processor to the other second component part.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As such, the term "processors" can refer to any type of processing element including microprocessors, coprocessors, programmable logic devices, field programmable gate arrays, state machines, or any other control mechanism. Furthermore, there is no intention to be bound by any theory presented in the preceding background or the following detailed description.

Prior art systems require two complete data signals to be compared to each other in their entirety which imposes a relatively high bandwidth cost. The subject matter described herein provides an improvement over the prior art whereby the bandwidth required on a data bus for data verification purposes may be reduced significantly by splitting a specific data sequence into component parts and using the component parts to accomplish data integrity verification.

Figure 1:
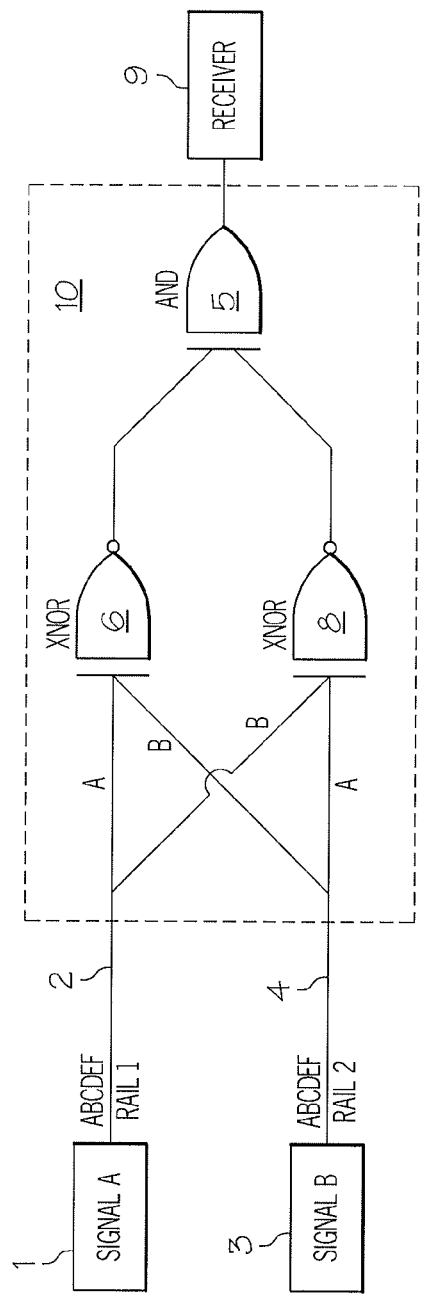
FIG. 1 is a simplified flow diagram of a comparator circuit.

FIG. 1 is a simplified circuit diagram for a self checking, dual rail data bus 10 as may be known in the art. The bus comprises a first rail 2 and a second rail 4. Combined the rails may also be known as lanes. Each of the rails (2, 4) transmits normally-identical data sequences or messages from transmitting devices (1, 3) toward a receiving device 9. Receiving device 9 may further re-transmit the message.

In the interest of simplicity and clarity of discussion, the normally identical data sequences (A and B) will each be described herein as an alphabetic sequence A-B-C-D-E-F.

However, one of ordinary skill will appreciate that the identical data sequences (A, B) may be manifested as any suitable type of data sequence or message format known in that art and should not be limited to the transmission of a serial sequence of electronic pulses or alphanumeric characters. The data sequences (A, B) may also comprise data packets and be encoded using various data encryption protocols as may be known in the art.

Each particular data sequence (A, B) is fed into two dual-input exclusive nor ("XNOR") gates (6, 8) while transiting the bus 10. An XNOR gate returns a "1" only if each of its inputs is identical. Because each data sequence A and B is normally identical, the inputs to each of the XNOR gates (6, 8) should also be identical unless there is an error in transmission. Therefore, detecting identical inputs, each XNOR gate (6, 8) will each return a logical "1" that together comprise normally identical dual inputs to a simple "AND" gate 5. The AND gate 5 then allows the reproduction of data sequence A, B for follow on transmission by other circuitry (not shown).

On the other hand, if there happens to be a discrepancy between the data sequences A and B related to a particular XNOR gate (6, 8), then the XNOR inputs will not be identical and a logical "0" will be generated by the XNOR gate(s) (6, 8) as an input to the AND gate 5. The AND gate 5, detecting dissimilar inputs, will then generate a logical "0" which may be used by other circuitry (not shown) to prevent the erroneous data sequence from being transmitted further.

It should be noted that in this prior art example, each complete and identical data sequence (A, B) is transmitted in full along a separate rail (2, 4) requiring a total aggregate bandwidth for their combined transmission. The two normally identical data sequences (A, B) actually move across two redundant rails or are multiplexed through a single rail.

Figure 2:
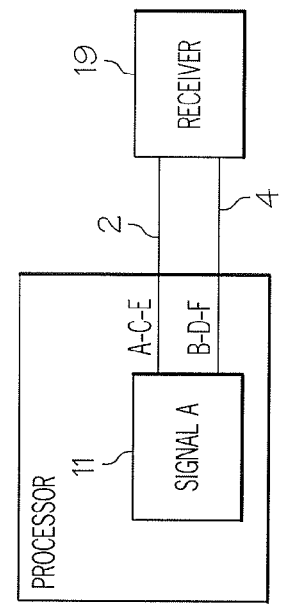
FIG. 2 is a simplified diagram of an embodiment illustrating a means for data verification by splitting a data signal.

FIG. 2 is a simplified diagram of an exemplary embodiment according to the subject matter disclosed herein that accomplishes data verification of a data sequence A while consuming a fraction of the total aggregate bandwidth of the conventional methods that necessarily use sequences A and B. In some embodiments, processor 11 may split the data sequence A into two components temporally. As a specific non-limiting example, the first component of the data sequence A may comprise the data elements A-C-E and may be transmitted over the first rail 2. The second component of the data sequence A may comprise the data elements B-D-F and be transmitted over the second rail 4. It will be appreciated by those of ordinary skill in the art after having read the disclosure herein that the data sequence need not be segmented across only two rails. Three or more rails with three or more components of the data sequence A may also be used as may accommodate a specific application.

Upon each component of the data sequence A reaching a receiving device 19, the receiving device 19 recombines the first part of the data sequence A-C-E and the second part of the data sequence B-D-F utilizing a software protocol above that of the bus. Recombination is accomplished using a predefined algorithm such as the given example, A-C-E+B-D-F=A-B-C-D-E-F. The algorithm used can have many implementations beyond that of the given example. For instance it is not significant that the data sequence from each rail be alternating as in the example. Sequences of A-B-C and D-E-F could also be used. The software protocol determines if the recombination is valid by performing checks across the recombined data, such as CRC, checking for missing data, or similar methods. If the data sequence A is recombined properly, as determined by the protocol executing in the receiving device 19, then the recombined data sequence A-B-C-D-E-F is deemed valid for use by the destination. If the data sequence A has been corrupted, then the data sequence will not recombine properly and may be discarded or used for trouble shooting purposes as may be directed by the protocol software above that of the bus.

As will be more fully described blow, multiple custom programmed processors may be used in other embodiments to generate multiple and normally identical data sequences (A, B). Those multiple data sequences may be compared to each other to determine if there has been a processing error and to prevent promulgation of the erroneous data sequences.

Alternatively, the subject matter disclosed herein may be implemented using off-the-shelf systems using differential pair signaling, such as SpaceWire or Firewire, without modification of their bus protocols, or without insertion of protocols above that of the bus as described above. SpaceWire is a spacecraft data bus based in part on the IEEE 1355 standard of communications that covers the physical and data-link layers of the OSI model of communications. Within a SpaceWire network, the nodes are connected through low-latency, full-duplex, point-to-point serial links and packet switching wormhole routers that use data/strobe encoding. In this case the data sequence, A-B-C-D-E-F, is dependent on two signals (data (D) and strobe (S)) to successfully recreate each part (A, B, C, D, E, or F) of the data sequence. Other non-limiting examples of data busses to which the subject matter herein may be applied also include a CanBus and Ethernet.

Data/strobe encoding is an encoding scheme for transmitting data in digital circuits that uses two signal rails (i.e. lines), a data rail and a strobe rail. The encoding is characterized by one of the data D or strobe S signals changing its logical value between "1" and "0" in one clock cycle, but never both. SpaceWire and Firewire data busses utilize data/strobe encoding. However, the principles herein may be applied to other encoding schemes such as the $Can_{Lo}$ and $Can_{Hi}$ signals utilized by the Canbus protocol and the MII or RMII interface to the PHY for Ethernet.

Figure 3:
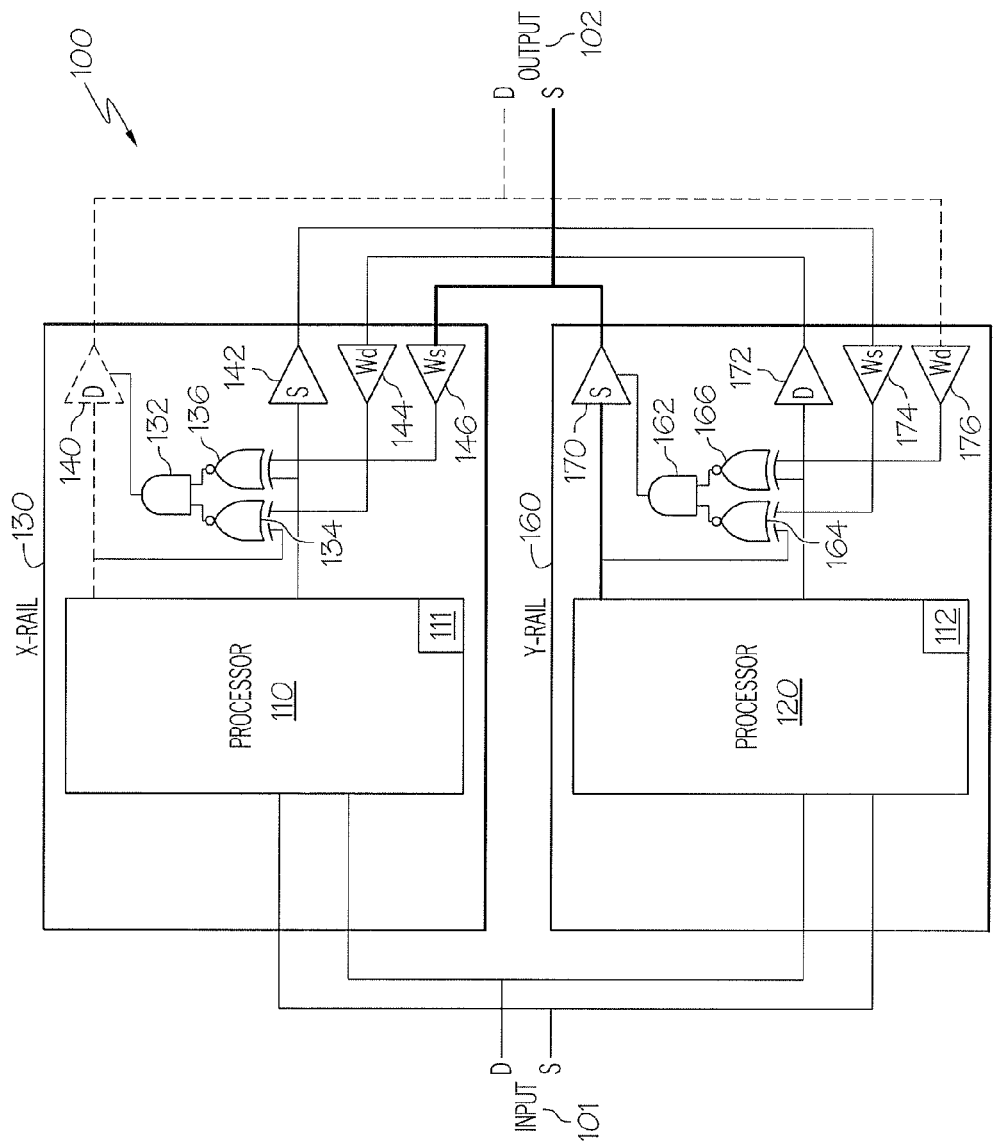
FIG. 3 is a simplified block diagram of an exemplary embodiment of a dual rail data verification system as described herein.

FIG. 3 is an exemplary circuit diagram implementing the subject matter disclosed herein in the context of data/component sequencing. In this exemplary embodiment, bus 100 comprises two lanes or rails 130 and 160. Each rail (130, 160) may be physically identical and may each handle the strobe S and data D component signals in a separate but complementary fashion. As is illustrated, a data input signal 101 is input to processor 110 and to processor 120, which are connected in parallel.

The purpose of the processors (110, 120) is to compute data outputs for the intended mission of the system in part based on the system inputs 101. In brief, rail X 130 receives the data input signal 101 and outputs the component sequence D after performing an integrity comparison with the output of rail Y 160. Rail Y 160 receives the data input signal 101 and outputs the component sequence S after performing an integrity comparison with the output of rail X 130. One of ordinary skill in the art will recognize that the roles of processors 110 and 120 may be reversed.

The purpose of processor 110 in the rail X 130 is to process data input signal 101 according to instructions 111, create component sequences S and D from the data input signal 101 and transmit signal component D downstream to a receiving device (not shown) via output 102 along rail X 130. The component sequence D is also inputted to the XNOR gate 134 while the component sequence S is inputted to the XNOR gate 136.

Conversely, the purpose of processor 120 in the rail Y 160 is to process data input signal 101 according to instructions 112, to create component sequences S and D from the data input signal 101 and to transmit component sequence S downstream to a receiving device (not shown) via output 102 along rail Y 160. The component sequence D is also inputted to the XNOR gate 164 while the component sequence S is also inputted to the XNOR gate 166.

The rail X 130 also contains a non-limiting, exemplary set of logic gates that are configured to compare the component sequences S and D to detect processing and transmission errors. The exemplary logic gates illustrated herein comprise two XNOR gates (134, 136), an AND gate 132 and two signal drivers 140 and 142. A similar configuration is depicted for rail 160 and comprises two XNOR gates (164, 166), an AND gate 162 and two drivers 170 and 172. However, one of ordinary skill in that art will appreciate that a comparator circuit may be constructed using other logic gate configurations (e.g. XOR gates) as well as through the use of operational amplifiers and the like.

In addition to the component sequence S, the XNOR gate 134 also receives a second input $W_d$ transmitted via signal drivers 144 and 172 from the processor 120 of rail Y160. Normally, in the absence of a transmission error, the input signal $W_d$ received from signal driver 172 of rail Y 160 is identical to component sequence D received from processor 110. If the component sequence D and input signal $W_d$ are indeed error free, and therefore are identical, XNOR gate 134 returns a logical "1" output. If either or both of the signals D and $W_D$ are not error free, and therefore not identical, XNOR gate 134 returns a logical "0" output.

Processor 110 of rail X also outputs the component sequence S as a wrap around signal $W_s$ to rail Y 160 via signal drivers 142 and 174. The component sequence S is also inputted to an XNOR gate 136. XNOR gate 136 also receives a wrap around component sequence $W_s$ that is transmitted from the processor 120 of rail Y 160 via signal drivers 146 and 170.

Normally, in the absence of a transmission error, the component sequence S is identical to the wrap around component sequence $W_S$ received from signal driver 170 of rail Y 160. If the component sequences S and $W_s$ are error free, and therefore identical, XNOR gate 136 returns a logical "1" output. If the signals S and $W_S$ are not error free, and therefore not identical, XNOR gate 136 returns a logical "0" output.

The rail X 130 includes an AND gate 132 which receives the outputs from XNOR gates 134 and 136. The AND gate 132 acts to interrupt component sequence D that is being driven to output 102 via signal driver 140 when either output from XNOR gate 134 or 136 indicates an error and generates a logical "0". One of ordinary skill in the art will appreciate that if either XNOR gate 134 or 136 generate a logical "0" the AND gate 132 will also generate a logical "0". The logical "0" output may then be used to send an error code, disable the signal driver 140 or otherwise disconnect the component sequence D from the output 102.

Similarly, processor 120 of rail Y 160 generates sequence component S and outputs the component sequence S to output 102 via the signal driver 170. The component sequence S is also inputted to the XNOR gate 164. The XNOR gate 164 also receives a wraparound second input $W_S$ transmitted from the processor 110 of rail X via signal drivers 142 and 174. Normally, in the absence of a transmission error, the wrap around input signal $W_S$ from the signal driver 142 of rail X 130 is identical to component sequence S generated by processor 120. If the component sequences S and $W_S$ are error free, and therefore identical, XNOR gate 164 returns a logical "1" output. If the signals S and $W_S$ are not error free, and therefore not identical, XNOR gate 164 returns a logical "0" output.

Processor 120 of rail Y 160 also creates component sequence D and outputs the component sequence D to rail X 130 via signal driver 172 as the wrap around signal $W_d$ to signal driver 144 of rail X 130. The component sequence D is also inputted to an XNOR gate 166. XNOR gate 166 also receives a wrap around component sequence $W_d$ that is transmitted from the processor 110 of rail X via signal drivers 140 and 176.

Normally, in the absence of a transmission error, the wrap around signal $W_d$ received from signal driver 140 of rail X 130 is identical to component sequence D. If the component sequences D and $W_d$ are error free, and therefore identical, XNOR gate 164 returns a logical "1" output. If the signals D and $W_d$ are not error free and therefore not identical, XNOR gate 166 returns a logical "0" output.

The rail X includes an AND gate 162 which receives the outputs from XNOR gates 164 and 166. The AND gate 162 acts to interrupt component sequence S that is being driven to output 102 via signal driver 170 when either output from XNOR gate 164 or 166 is a logical "0". One of ordinary skill in the art will appreciate that if either XNOR gate 164 or 166 generates a logical "0", the AND gate 162 will also generate a logical "0". That logical "0" output may disable the signal driver 170 or otherwise disconnect the component sequence D from the output 102.

As noted above, the logic gates combinations (132, 134, 136 and 162, 164, 166) are exemplary. Their purpose is to determine if each portion of the signal (S, D) being transmitted to the receiving device is transmitted properly. However, skilled artisans will appreciated that other combinations of logic gates and other devices may be suited to perform the same tasks. For example, an XNOR gate may be constructed using only NAND gates.

Upon receipt at a receiving device (not shown) the verified individual strobe S and data D signals are recombined into the single data message (S+D) using the normal SpaceWire messaging protocol. Corrupted data and/or component sequences may manifest themselves in one of two ways. If one of the signals S or D is missing the receiving device (not shown) will reject the entire message as missing one or the other component sequence S or D. In cases where each component S and D are each received but cannot be reassembled using the normal bus protocol, the message may also be rejected as being corrupted by, or corrupted in transit from, the sending processors 110 and 120 to the receiving device (not shown).

In other exemplary embodiments using the Canbus messaging protocol, the subject matter disclosed herein may also be implemented. For example, in a case where there is a single high priority node that must communicate to other communication nodes, the subject matter may be implemented by providing one of the physical layer signals ($Can_{Hi}$ and $Can_{Lo}$) to each other node in the network by one of two redundant sources (i.e. Rail X 130 and Rail Y 160). In the event that an error occurs, the logic circuit may be configured to keep the respective signal driver (140 or 170) sending a signal in the recessive bit state, which will be viewed by a receive node as a series of logical 1's and invalid bits resulting in a improperly formed message at the receiving device (not shown) and discarded.

In other embodiments using the Ethernet messaging protocol, the subject matter disclosed herein may be implemented by inserting the method between the Mac and Phy layers of the protocol stack when using Media Independent Interface (MII) or the Reduced MII (RMII) for communication between the hardware realized MAC and Phy components. For example, only one half of the data signals (4 for MII and 2 for RMII) would be sourced from each of two redundant signal sources to the Phy component. In the event of a detected error, the signal drivers associated with the source detecting the error simply would output a data stream that would insure that the cyclic redundancy check wrapper on the data packet will cause a data failure indication at the receiving device.

A cyclic redundancy check (CRC) or polynomial code checksum is a non-secure hash function designed to detect accidental changes to raw computer data, and is commonly used in digital networks and storage devices such as hard disk drives. A CRC-enabled device calculates a short, fixed-length binary sequence, known as the "CRC", for each block of data and sends or stores them both together. When a block is read or received the device repeats the calculation. If the new CRC does not match the one calculated earlier, then the block contains a data error and the device may take corrective action such as rereading or requesting the block is resent, otherwise the data is assumed to be error free.

Figure 4:
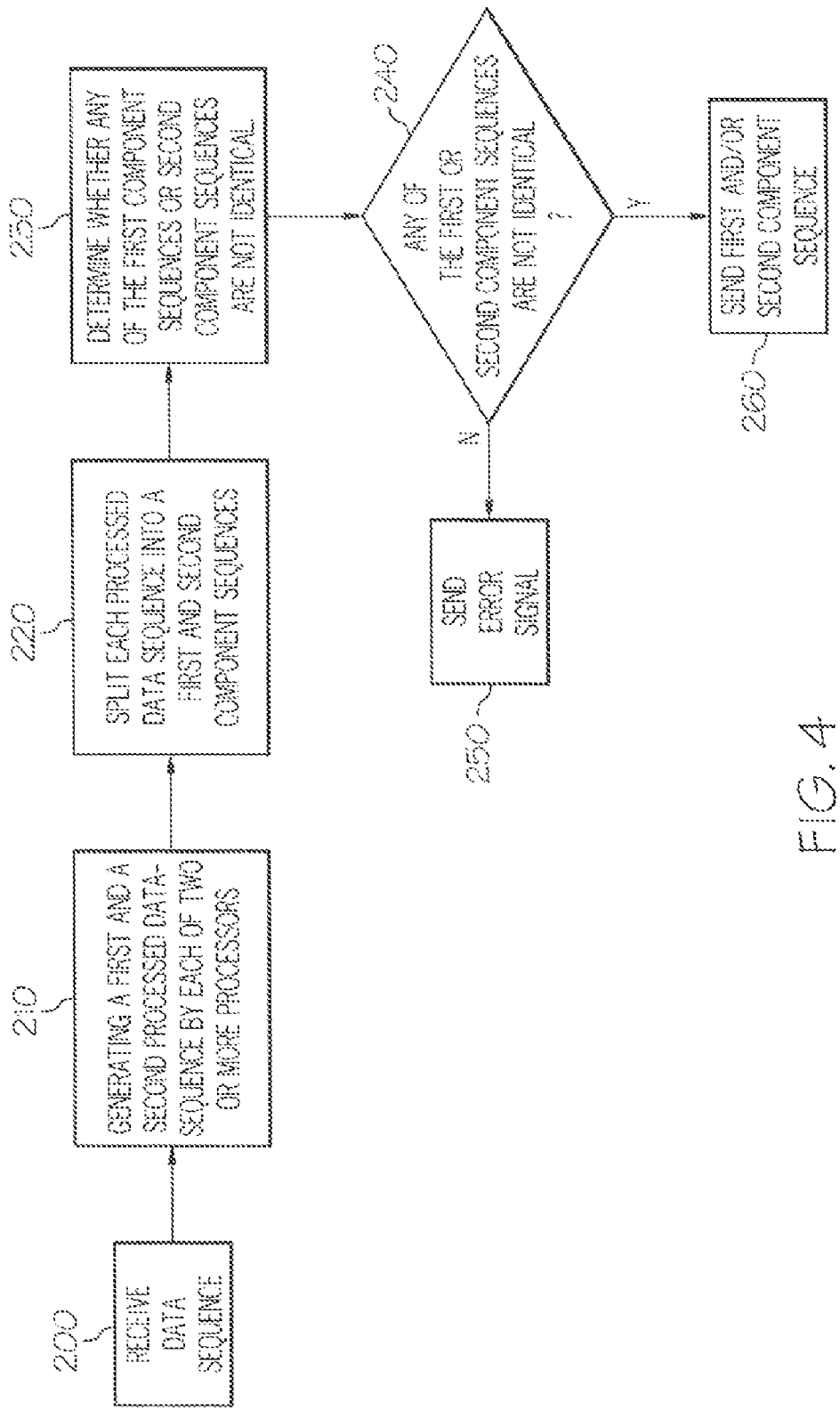
FIG. 4 is a simplified flow diagram of an exemplary embodiment of the methods disclosed herein.

FIG. 4 provides a simplified logic flow diagram of an exemplary embodiment. The method begins at process 200 where the data input signal 101 is received. At process 210, each of two or more processors (110, 120) process the data input signal 101 according to instructions (111, 112) stored therein. The instructions 111 and 112 may or may not be identical sets of instructions and may or may not be in compatible formats. However, each of instructions (111, 112) causes the two or more processors (110, 120) to process the input data sequence in exactly the same manner and normally produce exactly the same outputs.

At process 220, each of the two or more processors temporally splits the data input signal 101 into two or more component data sequences. As disclosed above, the normal differential signal pair signaling may be used to create component data sequences in some embodiments. In other embodiments, the two or more processors (110, 120) may be programmed to separate the data input signal 101 temporally, as disclosed above.

Once split, it is determined whether the first component sequences are identical to each other and whether the second component sequences generated by each processor 110, 120 are not identical at process 240. This determination may be accomplished in any suitable manner known in the art, now or in the future. As a non-limiting example, such a determination may be accomplished by a direct comparison between the first component sequences of the first and second processors (110, 120) and by a direct comparison between the second component sequences of the first and second processors (110, 120). The use of a direct comparison is being used herein in the interest of clarity and brevity. Other means to determine whether data signals may be identical that may be suitable for a particular application are also contemplated herein and do not depart from the scope of the disclosure.

At process 250, an error signal is sent to the receiving device indicating that data being transmitted, or to be transmitted, across a rail (130, 160) has an error or is not being transmitted at all. At process 260, the first and second component sequences are transmitted to the receiving device (not shown).

Figure 5:
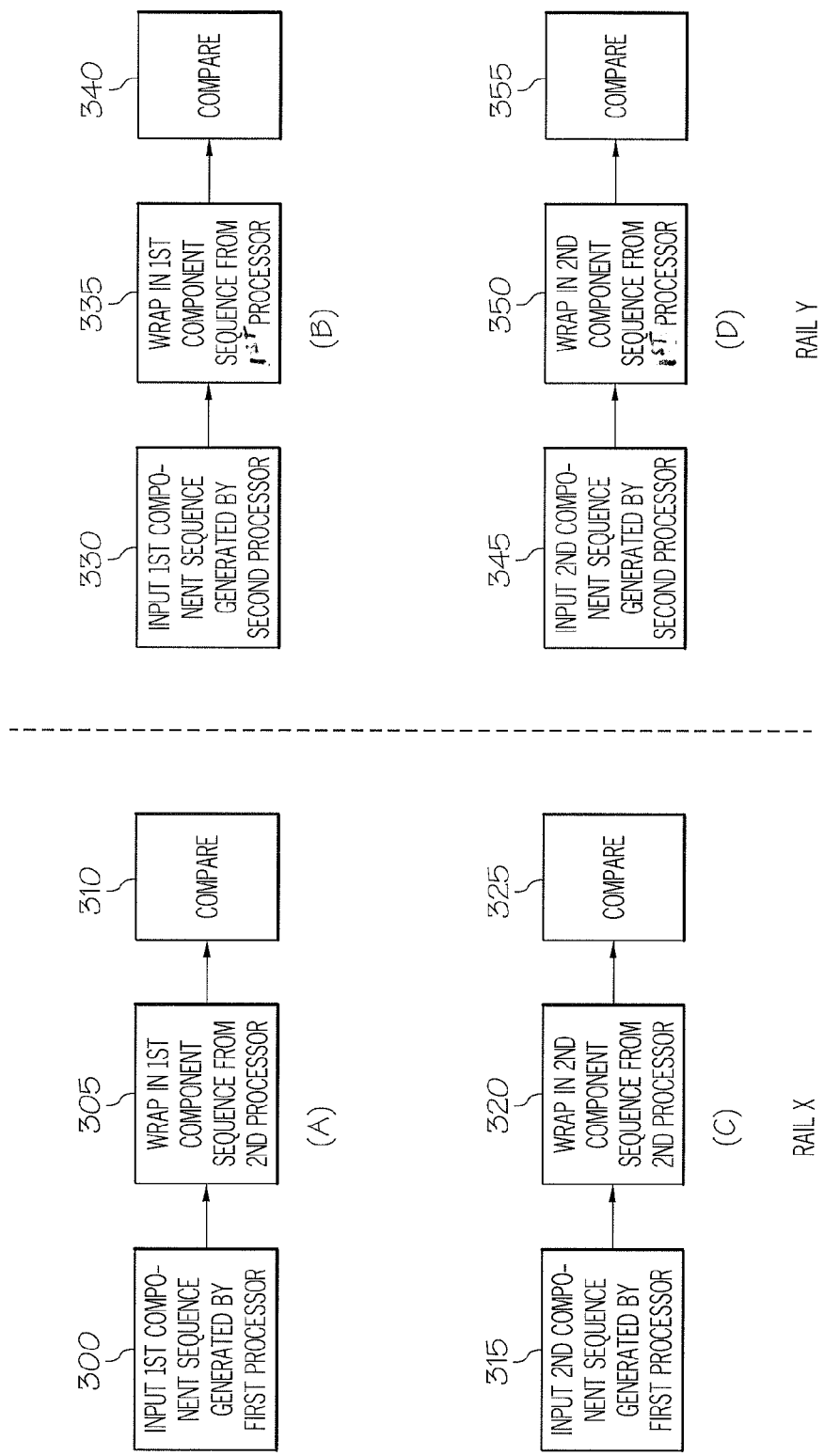
FIG. 5 comprises simplified flow diagrams depicting exemplary comparing processes.

FIG. 5 comprises a set of simplified flow diagrams depicting an exemplary determination step 230 using a direct comparison between component sequences. FIG. 5(A) begins with receiving a first component sequence from the first processor 110 at process 300, wrapping in the first component sequence from the second processor 120 at process 305 and then comparing the two first component sequences. Processes 315, 320 and 325 of FIG. 5(C) compare the second component sequence from the first processor 110 and the second component sequence from the second processor 120. Processes 330, 335 and 340 of FIG. 5(C) compare the first component sequence from the second processor 120 and the first component sequence from the first processor 110. Similarly, processes 345, 350 and 355 of FIG. 5(D) compare the second component sequence from the second processor 120 and the second component sequence from the first processor 110.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method to verify the integrity of a signal transmitted across a multiple rail data bus having at least a first rail and a second rail, the method comprising:
   generating a first processed signal from the signal using a first processor;
   generating a second processed signal from the signal using a second processor connected in parallel to the first processor;
   splitting each of the first processed signal and second processed signal into a first component sequences and a second component sequences, the first component sequences being different from the second component sequences;
   determining that the first component sequences are not identical;
   when the first component sequences are not identical, then transmitting a first error signal to a receiving device via the first rail of the multiple rail data bus;
   determining that the second component sequences are not identical;
   when the second component sequences are not identical, then transmitting a second error signal to the receiving device via a second rail of the multiple rail data bus.

2. The method of claim 1, wherein the first component sequences generated by each processor are normally identical to each other and the second component sequences generated by each processor are normally identical to each other.

3. The method of claim 1, wherein the step of determining that the first component sequence are not identical comprises inputting a first component sequence generated by the first processor to a comparator circuit associated with the first rail and wrapping around and inputting a first component sequence generated by the second processor to the comparator circuit associated with the first rail.

4. The method of claim 3, wherein the step of determining that the second component sequences are not identical comprises inputting a second component sequence generated by the first processor and wrapping around and inputting a second component sequence generated by the second processor to the comparator circuit associated with the first rail.

5. The method of claim 4, wherein the step of determining that the second component sequences are not identical comprises inputting the second component sequence generated by the second processor and wrapping around and inputting the second component sequence generated by the first processor to a comparator circuit associated with the second rail.

6. The method of claim 3, wherein the step of determining that the first component sequences are not identical comprises inputting the first component sequence generated by the second processor and wrapping around and inputting the first component sequence generated by the first processor to a comparator circuit associated with the second rail.

7. The method of claim 1 wherein either of the first error signal or the second error signal is an absence of any signal.

8. The method of claim 1 wherein either of the first error signal or the second error signal is a predefined bit stream.

9. The method of claim 1 further comprising, recombining the first component sequence generated by the first processor and the second component sequence generated by the second processor by a receiving device.

10. The method of claim 9, wherein the first component sequence is one of a strobe and a data signal and the second component sequence is the other of the strobe and the data signal.

11. An apparatus for verifying the integrity of a signal transmitted across a data bus, comprising:
  a first processor configured to split a signal in order to generate at least a first component sequence and a second component sequence;
  a first comparator circuit configured to compare the first component sequence generated by the first processor to another first component sequence and to compare the second component sequence generated by the first processor to another second component sequence;
  a second processor configured to split the signal into at least the other first component sequence and the other second component sequence, and
  a second comparator circuit configured to compare the first component sequence generated by the first processor to the other first component sequence and to compare the second component sequence generated by the first processor to the other second component sequence.

12. The apparatus of claim 11, wherein the first comparator circuit comprises an interconnected combination of logic gates.

13. The apparatus of claim 11, wherein the second comparator circuit comprises an interconnected combination of logic gates.

14. The apparatus of claim 11, further comprising a first signal driver configured to generate an error signal when at least of the first component sequence generated by the first processor and the other first component sequence are not identical and when the second component sequence generated by the first processor and the other second component sequence are not identical.

15. The apparatus of claim 14, wherein the first comparator circuit is configured to disable the first signal driver when at least of the first component sequence generated by the first processor and the other first component sequence are not identical and when the second component sequence generated by the first processor and the other second component sequence are not identical.

16. The apparatus of claim 11, further comprising a second signal driver configured to generate an error signal when one of the first component sequence and the other first component sequence are not identical and when the second component sequence and the other component sequence are not identical.

17. The apparatus of claim 16, wherein the second comparator circuit is configured to disable the second signal driver when one of the first component sequence generated by the first processor and the other first component sequence are not identical and when the second component sequence and the other component sequence are not identical.

18. The apparatus of claim 11, wherein the second processor generates the other first component sequence.

19. The apparatus of claim 18, wherein the second processor generates the other second component sequence.

20. The apparatus of claim 19, wherein the first component sequence is one of a strobe and a data signal and the second component sequence is the other of the strobe and the data signal.

* * * * *